United States Patent Office 2,986,943
Patented June 6, 1961

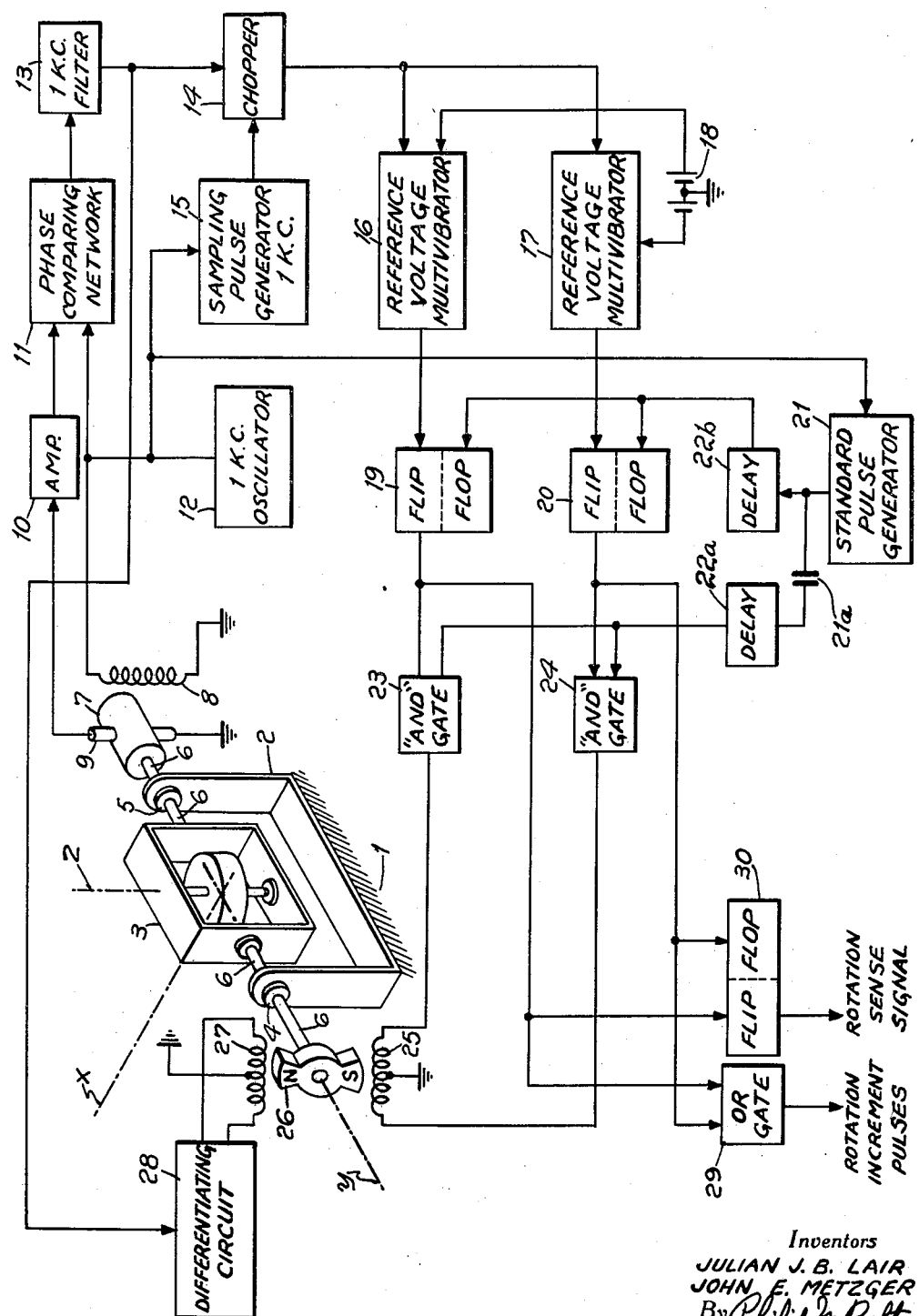

2,986,943
GYROSCOPE SYSTEMS
Julien J. B. Lair, Glen Ridge, and John E. Metzger, Closter, N.J., assignors to International Telephone and Telegraph Corporation, Nutley, N.J., a corporation of Maryland
Filed Aug. 22, 1958, Ser. No. 756,728
7 Claims. (Cl. 74—5.4)

This invetnion relates to gyroscope systems and more particularly to such a system in which a gyroscope, coupled to a rotatable body, produces pulses each representing equal increments of rotation of said body about a given axis thereof.

In the past, single degree of freedom gyroscopes having dampers such as dashpots have been employed with rotation sensing and torque generating means both coupled to their output axis. The purpose of such gyro systems is to sense rotations of a body and produce a signal for driving a platform on which the gyro is carried to maintain the platform in a fixed orientation in inertial space and also to maintain the spin axis of the gyroscope essentially stationary with respect to said platform. In such systems the torque generator is responsive to signals from the rotation sensor and torques the gyro about its output axis to maintain the gyro spin axis at a constant reference orientation with respect to the platform, the purpose being to restrict changes in the angle between the spin axis and the platform to small values because interfering effects would appear when the angular momentum vector of the spinning gyroscope tilts far enough with respect to the platform to provide an appreciable component along the input axis. The torque generators in such prior systems are energized by A.C. or D.C. signals, the magnitude of said A.C. or D.C. signals representing the input axis rotation rate, such as for example, the roll rate or pitch rate of an aircraft. Consequently, integration of such A.C. or D.C. signals yields the angle between the platform and the aircraft, and, thus, the aircraft's orientation relative to inertial space.

In such prior systems two integrations take place, the first results from the action of the damper and the second from the action of the mechanical drive applied to the platform. The first integration is typical of all integrating gyros having damper means coupled to their output axes so that output torque which is proportional to input axis angular rotation rate operates against the damper allowing rotation of the gyro about its output axis at a rate proportional to said torque and thus proportional to the input rotation rate. The second integration is accomplished by the action of motor means driving the platform in response to a signal from the rotation sensor so that the platform position represents the integration of the signal.

It is an object of this invention to provide a gyroscope system producing pulses each indicative of equal increments of rotation of a body about an axis.

It is another object of this invention to provide a system for use with a single degree of freedom gyroscope for maintaining the gyroscope spin axis essentially stationary with respect to the platform to which said gyroscope is mounted.

It is another object to provide a novel system for sensing input rotations of a gyroscope at its output axis and for torquing the gyroscope about its output axis so as to oppose said rotations.

It is another object to provide an integrating gyroscope wherein damping is achieved electrically rather than mechanically.

It is another object to provide a gyroscope system producing pulses each indicative of equal increments of rotation of a body to which said gyroscope is fixed and to provide a signal indicative of the sense of said rotations.

It is a feature of this invention to employ a gyroscope carried by a body having rotation sensing and torquing means coupled to the precession axis thereof and an electrical circuit coupling said sensing and torquing means whereby said torquing means is energized by a rate signal to achieve damping and by quantized units of electricity each unit representing an equal increment of rotation of said gyroscope about its input axis to maintain the gyro spin axis fixed with respect to said body.

It is another feature to apply standard pulses from a single standard pulse generator to said torquing means in response to the output of said sensing means for torquing the gyroscope spin axis as necessary to maintain said spin axis essentially stationary with respect to the body from which it is suspended.

It is another feature to employ means coupled to said sensing means for determining the direction of precessional rotation of said gyroscope and to produce signals indicative of said direction for controlling the application of said units of electricity to the torque generating means.

It is another feature to employ torquing means comprising stator members and a rotor member, said rotor member being fixed to the output axis of said gyroscope and to apply said units of electricity to one of said stator members in response to the output of said sensing means and to differentiate the output of said sensing means and to apply the resulting signal to the other stator member to provide damping to maintain the gyro spin axis essentially stationary so that each of the standard units of electricity applied represents an equal increment of rotation of said gyroscope about its input axis.

Other and further features and object of this invention will be apparent from the following specific description taken in view of the drawing, in which:

The figure shows a single degree of freedom gyroscope having sensing and torquing means coupled to its output axis and circuits associated therewith for producing pulses representative of equal increments of rotation of said gyroscope about its input axis and producing a signal indicative of the sense of said rotation.

Turning to the figure there is shown a single degree of freedom gyroscope preferably rotatably attached to a body 1 by suspension 2 which is fixed to body 1 so that a rotation of body 1 about its x axis causes the gyroscope and housing 3 to precess on bearings 4 and 5 supporting axle 6 which is orientated in the direction of the body y axis and preferably concentric with the body y axis. The precession angle of the gyroscope is detected as a phase shift of a 1 kc. signal induced in rotor coil 7, fixed to one end of axle 6 and inductively coupled to stator coil 8. This phase shifted 1 kc. signal is fed from rotor coil 7 via brush 9 to amplifier 10 and in turn to phase comparing network 11 where it is phase compared with the signal from a 1 kc. oscillator 12 which also energizes coil 8. The output of network 11 is a pulsating D.C. signal whose D.C. sign and magnitude are indicative of the phase difference between input signals. This output is filtered by 1 kc. filter 13 and fed to chopper 14 which is controlled by pulse generator 15 generating 1 kc. chopper pulses in response to the output of 1 kc. oscillator 12. The chopped D.C. output signal from chopper 14 is then fed to each of similar reference voltage multivibrators 16 and 17 which are also fed D.C. signals from battery 18, multivibrator 16 being fed a positive voltage from battery 18 and multivibrator 17 being fed a negative voltage from battery 18. The design and operation of multivibrators 16 and 17 may be as described on page 343, volume 19 of Radiation Laboratory Series published by McGraw- Hill. These multivibrators each produce a signal pulse output upon receiving a pulse from chopper 14 which is, in the case of multivibrator 16, more positive than the positive battery voltage fed to multivibrator 16 or, in the case of multivibrator 17, more negative than the negative battery voltage fed to multivibrator 17. The output of multivibrator 16 energizes double input bistable flip-flop circuit 19, and the output of multivibrator 17 energizes double input bistable flip-flop circuit 20. Each of these flip-flop circuits, 19 and 20, are reset simultaneously by a signal from standard pulse generator 21 via delay circuit 22b. Standard pulse generator 21 is triggered by the output of 1 kc. oscillator 12 and may, for example, consist of a shaping and differentiating circuit feeding a monostable multivibrator triggered by spike pulses from the differentiating circuit. The outputs of one stage of flip-flop circuits 19 and 20 are coupled to and control "and" gates 23 and 24, respectively, which gate the charge on capacitor 21a, which is coupled to the output of standard pulse generator 21, and feed said gated charge to one end or the other end of torquing stator coil 25 which is inductively coupled to rotor maget 26 fixed to axle 6, thereby torquing said axle.

It is important that the coulomb charge on capacitor 21a which passes through "and" gate 23 or 24 and discharges through stator coil 25 to ground each time one of the gates opens, be a constant charge each time, thus capacitor 21a must be very stable and the voltage pulses from the multivibrator in standard pulse generator 21 must be precisely controlled.

Delay 22a is included between capacitor 21a and gates 23 and 24 to delay the discharge from capacitor 21a until the pulses at the output of chopper 14, originating from oscillator 12, trigger one of multivibrators 16 or 17 and cause one of flip-flop circuits 19 or 20 to flip so as to open one of the gates 23 or 24. Delay 22b in the line feeding reset pulses from standard pulse generator 21 to flip-flop circuits 19 and 20 delays a longer interval than delay 22a so as to allow time for capacitor 21a to discharge through stator coil 25 before the flip-flop circuit is reset and the gate closes.

Another stator coil 27 inductively coupled to rotor magnet 26 is energized by the output of differentiating circuit 28 which differentiates the filtered signal from phase comparing network 11, thus providing negative rate feedback or damping to the system. This damping serves also to make the gyroscope act as an integrating gyro just as the viscous damper in prior systems, by causing the gyro to rotate about its output axis (y) at a rate proportional to the rotation rate of the gyro and body 1 about the input axis (x).

In operation, the output of chopper 14 consisting of positive or negative pulses causes multivibrators 16 and 17 to energize flip-flop circuits 19 and 20, respectively, when the pulses from chopper 14 exceed predetermined voltage values, determined by battery 18. When flip-flop circuits 19 and 20 are so energized, gates 23 or 24 are opened allowing the unit charge on capacitor 21a from standard pulse generator 21 to be applied to one side or the other of torquing coil 25 causing axle 6 to be torqued in such a direction as to oppose the tendency of gyroscope housing 3 to precess in response to a rotation of body 1 about its x axis. The outputs of flip-flop circuits 19 and 20 are also fed to "or" gate circuit 29 whose output signal consists of pulses each representative of equal increments of rotation of body 1 about its x axis. The sign of each of these pulses is represented by the signal output from one stage of double input bistable flip-flop circuit 30, which is also coupled to the outputs of flip-flop circuits 19 and 20.

As mentioned above it is important that the coulomb charge which is discharged through stator coil 25 each time one of gates 23 or 24 opens be the same each time. This requirement becomes obvious when we consider that the torque T, tending to rotate the gyroscope and housing about axle 6 in response to an input rotation rate W is opposed by the torque generator consisting of coil 25 and rotor 26 and the counter torque generated is proportional to the electrical current in coil 25, denoted $I_{25}$. Therefore:

$$T \alpha W \alpha I_{25}$$

The angle of rotation of the body about the x axis in the interval $\Delta t$, denoted $\Delta \theta$, is $W \Delta t$ and thus:

$$T \Delta t \alpha \Delta \theta \alpha I_{25} \Delta t$$

Consequently, the amount of charge fed to coil 25, denoted $I_{25} \Delta t$, required to maintain the spin axis of the gyroscope essentially aligned with the z axis is a measure of the angle body 1 has rotated about the x axis. In the embodiment hereinabove described, this amount of charge is represented by the number of pulses appearing at the output of "or" gate 29.

The pulses from "or" gate 29 and the signal from flip-flop circuit 30 could be fed to binary counting means for storing a number representative of the angle of rotation of body 1 about its x axis. By employing a plurality of such systems to yield a plurality of numbers representing angles, body attitude relative to inertial space can be computed.

While there is described above the principles of this invention in connection with specific apparatus and in particular, modifications thereof, it is obvious that other sensing and torquing means operating in conjunction with other arrangements of binary circuits and signal generators could be substituted without deviating from the spirit or scope of the invention. Therefore, it is to be clearly understood that this description is made only by way of example and not as a limitation on the scope of the invention as set forth in the objects and the accompanying claims.

We claim:

1. A system for sensing rotations of a body producing pulses each representing an equal increment of rotation of said body comprising a gyroscope having an input and an output axis, rotation sensing and torquing means coupled to said output axis, means for generating quantized signals of equal magnitude, control means coupled to and controlled by said rotation sensing means and coupling said generating means to said torquing means for applying said quantized signals of equal magnitude to said torquing means so as to maintain said gyroscope essentially stationary with respect to said body and means for producing an output representative of the quantized signals fed to said torquing means.

2. A rotation sensing device coupled to a body for producing output pulses each representing an equal increment of rotation of said body about a given body axis comprising a single degree of freedom gyroscope mounted to said body having its input axis parallel to said body axis, rotation sensing and torquing means coupled to the output axis of said gyroscope, means for generating standard signals, gating means coupling said generator to said torquing means, and control means coupling said sensing means to said gating means, said control means including control pulse forming means responsive to the output of said sensing means whereby said gating means is controlled by said control pulses so that quantized electrical signals from said standard signal generator are applied to said torquing means maintaining the spin axis of said gyroscope essentially stationary with respect to said body and means coupled to said control means for producing said output pulses indicative of equal increments of rotation of said body.

3. A system as in claim 2 and further including differentiating means coupling said rotation sensing means with said torquing means for damping precessional motion of said gyroscope.

4. A single degree of freedom gyroscope mounted to a body having means coupled thereto for producing pulses representing equal increments of rotation of said body about the input axis of said gyroscope comprising rotation sensing and torquing means coupled to the output axis of said gyroscope, means coupled to said sensing means for producing a D.C. signal indicative of the precessional angle of said gyroscope about its output axis, a signal chopper coupled to the output of said means for producing D.C. signals, a standard quantized signal generator synchronized with said chopper, gating means coupling the output of said generator to said torquing means, control means coupling the output of said chopper to said gating means whereby said gating means opens and applies quantized signals from said generator to said torquing means when the output of said chopper exceeds predetermined levels and means coupled to said control means for producing a pulse representing each quantized signal applied from said generator via said gating means to said torquing means.

5. A gyroscope as in claim 4 and further including differentiating means coupling the output of said D.C. signal producing means to said torquing means thereby damping the motion of said gyroscope about its output axis.

6. A single degree of freedom integrating gyroscope having rotation sensing, torque generating and precessional motion damping means coupled to its output axis and a device coupling said rotation sensing means to said torque generating means for producing pulses each representing equal increments of rotation of said gyroscope about its input axis comprising generating means for producing equal pulses, switching means coupled to said generating means by capacitance, serving to apply equal pulses of electricity from said generating means to said torquing means, control means coupling the output of said sensing means to said switching means and means coupling pulses from said control means to a utilization device for applying pulses to said utilization device each representative of equal increments of rotation to said gyroscope about its input axis and a signal representing the sense of said rotation.

7. A single degree of freedom gyroscope mounted to a body for measuring rotations of said body about the gyroscope input axis and having rotation sensing and torque generating means coupled to its output axis, said rotation sensing means having a rotor and a stator member, said stator member being energized by an A.C. source and a device coupling said stator and rotor members to said torque generating means for producing pulses each representing equal increments of rotation of said gyroscope about said input axis and producing a signal indicative of the sense of said rotation comprising phase comparing means coupled to said rotor and stator members, signal chopper means, a pulse generator responsive to said A.C. source for controlling said chopper, a filter feeding the output from said phase comparing means to said chopper, reference multivibrators coupled to the output of said chopper for producing pulses when the chopper output exceeds predetermined levels, a standard signal generator for charging a capacitor with quantized units of electricity, gating means coupling said capacitor to said torque generating means, means coupling said multivibrators to said gating means to control said gating means so that said torquing means is energized by said quantized units of electricity maintaining the spin axis of said gyroscope essentially fixed with respect to said body and circuitry responsive to said coupling means for producing pulses representative of equal increments of rotation of said body about said input axis.

References Cited in the file of this patent

UNITED STATES PATENTS

| | | |
|---|---|---|
| 2,620,669 | Braddon | Dec. 9, 1952 |
| 2,669,126 | Simmons et al. | Feb. 16, 1954 |
| 2,787,909 | Ruckstahl et al. | Apr. 9, 1957 |